Sept. 10, 1940.   E. E. ARNOLD   2,214,602

CLUTCH FOR AIRPLANE GENERATORS

Filed Nov. 12, 1938

WITNESSES:

INVENTOR
Edwin E. Arnold
BY
ATTORNEY

Patented Sept. 10, 1940

2,214,602

UNITED STATES PATENT OFFICE 2,214,602

CLUTCH FOR AIRPLANE GENERATORS

Edwin E. Arnold, Pittsburgh, Pa., assignor to Westinghouse Electric & Manufacturing Company, East Pittsburgh, Pa., a corporation of Pennsylvania Application November 12, 1938, Serial No. 239,911

16 Claims. (Cl. 192—103)

My invention relates to a centrifugally operated clutch which is useful, for example, in a drive between a mechanical power take-off from an airplane engine and a generator which is used to energize a radio set.

It is common in airplanes, as in automobiles, to drive a generator by a mechanical power take-off from the engine. In airplanes, one of the uses of such generator is to energize a radio set. It has been found highly desirable to use such radio set, not only when the airplane is in flight, but also when the airplane is grounded. In order to drive the generator when the airplane is grounded, the expedient has been adopted in the past of providing an auxiliary field winding on the generator which winding is energized by plugging into some commercial electric power source, thus driving the generator and securing the proper frequency alternating-current power for the radio set when the main engine is not running. The necessity thus arose for a suitable device for uncoupling the generator from the engine shaft, in other words a suitable overrunning clutch in said drive which, when the main engine is running, serves to automatically couple and drive the generator, but when the main engine is idle and the generator is plugged in to operate by itself as a motor generator set its shaft may be automatically uncoupled from the engine and thus run free, or "overrun" the normal driving member on the engine take-off shaft.

An object of my invention is to provide an improved centrifugal clutch, which embodies the feature of inertia engagement below the speed at which engagement would occur due to steady rise in speed.

Another object of my invention is to provide an improved centrifugal clutch which is particularly adapted, for example, in a drive between a mechanical take-off from an engine and a generator.

Another object of my invention is to provide a centrifugally operated clutch which is positive in driving action, yet which is sensitive to either or both speed (centrifugal) or inertia (angular acceleration in driving direction) for engagement, thus minimizing shock engagement which generally occurs in ordinary cam or roller clutches, or in a combination shoe and wedge clutch.

Other objects and advantages will become more apparent from the study of the following specification when considered in conjunction with the accompanying drawing in which.

Figure 1:
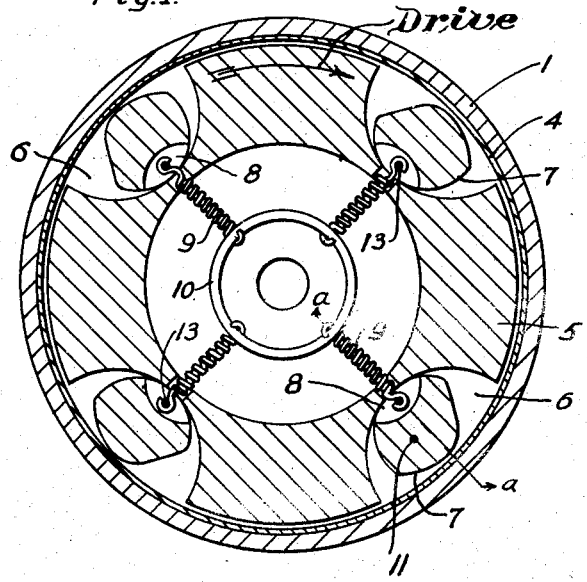
Figure 1 is a front view in cross-section taken along line I—I of Fig. 2 of a centrifugally operated clutch employing certain features of my invention.
Figure 2:
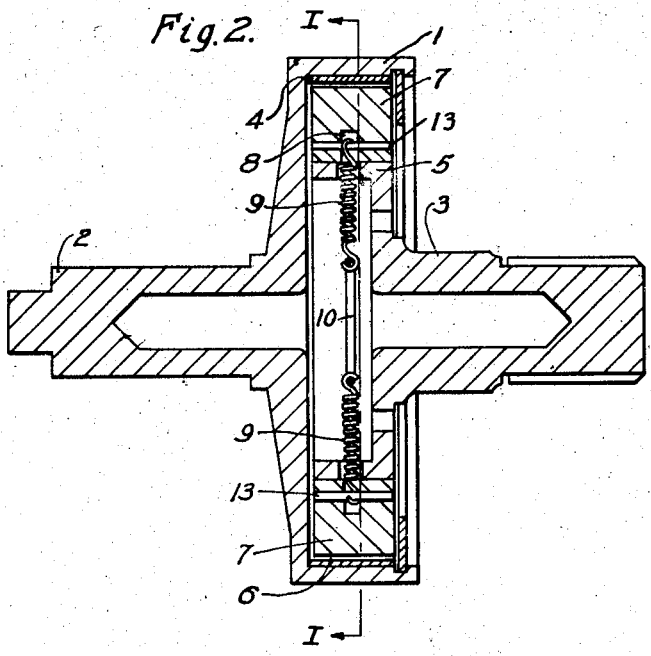
Fig. 2 is a side view in cross-section of the embodiment shown in Fig. 1.

Referring to Fig. 1 and Fig. 2, the clutch consists of a flanged drum member 1 which has a portion 2 which may be attached to a generator rotor, this then is the part to be driven by the driving member 3 which driving member may be attached to an engine power take-off. Drum 1 then is the overrunning member with relation to driving member 3 when the generator is running as a motor generator set independent of the engine. Member 1, while primarily a simple brake drum, is provided with a close-fitting yet free-floating, thin, hardened steel, lining 4 which is ring-shaped. Driving member 3 has a substantially annular flange portion 5 which has a plurality of pockets such as 6 equally disposed about its periphery. These pockets are shown as being semi-cylindrical in section inasmuch as these forms are the easiest to produce, although they could be of any other curvature or even flat-sided, in which case the cam would be altered in section to suit them.

In each pocket there is a cam member 7 which has a groove 8 in which groove is fastened, by means of a pin 13, a helical positioning spring 9 which extends through a hole in the annular flange, the other end of said spring being fastened to a support ring 10. It is thus seen that the cam members are held seated in the pockets by the tension of springs 9. The cam members are so proportioned and positioned that, when driving member 3 is stationary, there is maintained a clearance between the cam members and the lining member 4. Furthermore, the cam members are so shaped that when they are rocked on the surface of the cam pockets they gradually become wider in a radial direction until they contact lining member 4 and effect wedging action between the driving and driven members. It will be noted that the center of gravity, such as at point 11, of each of the cam members is offset with respect to a line such as a—a, which is drawn radially through the spring. Such offset is in the direction of drive as viewed from driving member to driven member. Normally, the cam members are wedged between the driving and driven members so that the driving member is coupled to the driven member. On the other hand, if the driven member is given a speed by the generator which is in excess of the speed of the driving member, then the wedging action of the cam members is released and thus an overrunning condition is established. The same overrunning condition is established if the driving member is at rest while the driven member is being rotated by some power source, for example, a motor generator set.

On complete stoppage of the driving member, the cams are returned to their central seating position and a clearance is established between the cam members and the inner surface of member 4.

The operation of the device is as follows: When it is desired to drive the driven member by the driving member, the driven member being initially at rest, the driving member starts to revolve either with slow acceleration or with a severe angular jerk or acceleration with little angular velocity. In the case of slow acceleration, the cam members are normally held inwardly against their seats by the positioning springs 9, which springs have sufficient tension to position the cam members against gravity. The center of gravity of each of the cams when held at rest is at a distance from radial line $a$—$a$ through the spring and through its natural position of equilibrium. Now as speed is gained, centrifugal force overcomes the tension of the springs and there is an instant of relief from contact between the cam members and their seats. The center of gravity seeks the position in line with radial restraint, that is, along line $a$—$a$. Thus the cam is revolved into contact with lining member 4 and as soon as contact is made, friction induces the cam to revolve still further until the relative rotation is stopped by the wedging action between the driving and driven member and a positive drive is secured.

If, on the other hand, there is a sudden angular jerk or acceleration of the driving member, as from the first explosive cylinder impulse, the inertia of the cam would tend to make it lag the angular motion of the driving member, but being held on its seat by attachment of the spring to pin 13 there will develop a turning movement about its contact with the pocket, or lacking sufficient friction, then about the pin center which brings the cam, as the result of the progressively increasing cam diameter, into contact with both the driving member and the lining member 4, resulting in a driving relationship therebetween.

Another feature of the clutch is that it is extremely sensitive and will effect rigid engagement at rather low orders of speed differences as between driver and driven, yet there is very little shock during engagement. This is effected by means of the lining member 4. When wedging action of the cams is first secured, lining member 4, by virtue of its thin cross-section, is readily distorted through the small-running clearance between it and the drum, thus transmitting through itself the wedging action of the cams. The results of this are two-fold. There is an extremely short time delay before final pressure is established. At the same time there is provided an extended zone of distributed pressure which would naturally allow a slight slip before locking together of the parts and thereby relieving shock engagement.

Figure 3:
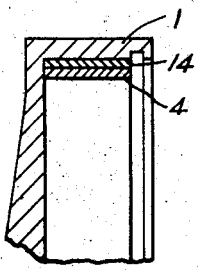
Fig. 3 is a side view in cross-section of a modification of the driven element shown in Fig. 2.

Fig. 3 shows a modification of the drum of Fig. 2 in which a floating ring 4 is backed up with an auxiliary ring 14 of softer or more resilient material to still further provide for more slip and softer engagement. Ring 14 may be made of any suitable material such as, for example, Micarta. Elements 1 and 4 are identical with elements 1 and 4, respectively, of Fig. 2.

Another feature of the clutch is symmetry of both driver and driven members, it being only necessary to reverse the cams in order that the drive may be in an opposite direction.

Obviously, lining 4 could be made of other suitable wear-resisting materials and lining 14 could be made of other suitable soft materials than those mentioned, which materials, however, would come within the purview of the present invention.

I am, of course, aware that others, particularly after having had the benefit of the teachings of my invention, may devise other forms of clutches embodying my invention and I, therefore, do not wish to be limited to the specific showings made in the drawing and the descriptive disclosure hereinbefore made, but wish to be limited only by the scope of the appended claims and such prior art that may be pertinent.

I claim as my invention:

1. A clutch comprising, in combination, a driving means and a driven means, said driven means comprising a flanged member and a continuous metallic ring-like member which closely fits but is relatively movable with respect to said flanged member, which ring-like member is located between said driving means and said driven means and which is sufficiently thin so as to transmit torque between, and permit coupling of, said driving and driven means but allow a small amount of slippage therebetween.

2. A clutch comprising, in combination, a driving means and a driven means, said driven means comprising a flanged member having an annular portion, and a continuous metallic cylindrical shaped member which closely fits inside of, but which is relatively movable with respect to said annular portion, which cylindrical shaped member is located between said driving means and said driven means, said cylindrical shaped member being sufficiently thin so as to transmit torque between, and permit coupling of, said driving and driven means but allow a small amount of slippage therebetween.

3. A clutch comprising, in combination, a driving means and a driven means, said driven means comprising a flange member and a continuous metallic ring-like member which closely fits but is relatively movable with respect to said flanged member and which is located between said driving means and said flange member, said ring-like member being sufficiently thin so as to transmit torque between, and permit coupling of, said driving and driven means but allow a small amount of slippage therebetween, said ring-like member being made of hardened steel.

4. A clutch comprising, in combination, a driving means and a driven means, said driven means comprising a flanged member having an annular portion, and a continuous cylindrical shaped member which closely fits inside of, but which is relatively movable with respect to, said flanged portion and which is located between said flange portion and said driving means, said cylindrical shaped member being sufficiently thin so as to transmit torque between, and permit coupling of, said driving and driven means but allow a small amount of slippage therebetween.

5. A clutch comprising, in combination, a driving means and a driven means, a plurality of continuous metallic cylindrical shaped members intermediate said driving and driven means, said members closely fitting but being relatively movable with respect to one of said means and being sufficiently thin so as to transmit torque between, and permit coupling of, said driving and driven means but allow a small amount of slippage therebetween.

6. A clutch comprising, in combination, a driving means and a driven means, said driven means comprising a flange member and a plurality of continuous cylindrical shaped members one of which is metallic and the other of which is of a softer material which closely fit within but are relatively movable with respect to said flange member and which are located between said driving means and said flange member, said cylindrical shaped members being sufficiently thin so as to transmit torque between, and permit coupling of, said driving and driven means but allow a small amount of slippage therebetween.

7. A clutch comprising, in combination, a driving means and a driven means, said driven means comprising a flange member having an annular portion, and a plurality of continuous ring-like members at least one of which is metallic which closely fit inside of, but which are relatively movable with respect to, said annular portion and which are located between said driving means and said flange portion, said ring-like members being sufficiently thin so as to transmit torque between, and permit coupling of, said driving and driven means but allow a small amount of slippage therebetween.

8. A clutch comprising, in combination, a driving member which includes a substantially annular flange portion, and a driven member, said annular flange portion having a plurality of pockets along the periphery thereof, a plurality of cam-shaped members, one in each of said pockets, a plurality of springs which are radially disposed through said annular flange portion, one for each of said cam-shaped members, a support means surrounded by said annular flange portion, each spring having one end connected to its corresponding cam-shaped member and the other end connected to said support means for yieldingly seating said cam-shaped members in said pockets, said cam members being so shaped as to gradually increase in thickness in a radial direction as they are rocked on the surface of said cam pockets and to such an extent as to be capable of wedging between said driving member and said driven member.

9. A clutch comprising, in combination, a driving member which includes a substantially annular flange portion, and a driven member, said annular flange portion having a plurality of pockets along the periphery thereof, a plurality of cam-shaped members, one in each of said pockets, a plurality of springs which are radially disposed through said annular flange portion, one for each of said cam-shaped members, the center of gravity of each of said cam-shaped members being normally offset from a line extending through said springs, a support means surrounded by said annular flange portion, each spring having one end connected to its corresponding cam-shaped member and the other end connected to said support means for yieldingly seating said cam-shaped members in said pockets, said cam-shaped members being so shaped as to gradually increase in thickness in a radial direction as they are rocked on the surface of said cam pockets and to such an extent as to be capable of wedging between said driving member and said driven member.

10. A clutch comprising, in combination, a driving member, a driven member, and cam means on said driving member which under predetermined conditions initiates driving engagement of said members solely as the result of sudden acceleration of said driving member and without the aid of centrifugal force, said cam means being arranged to be out of contact with said driven member when said driving member is rotating at low speed, in the absence of sudden acceleration of the driving member, irrespective of the direction of drive.

11. A clutch comprising, in combination, a driving member, a driven member, and means including a spring and cam mounted on said driving member which under predetermined conditions initiates driving engagement of said members solely as the result of sudden acceleration of said driving member and without the aid of centrifugal force, said cam being arranged to be out of contact with said driven member when said driving member is rotating at low speed, in the absence of sudden acceleration of the driving member, irrespective of the direction of drive.

12. A clutch comprising, in combination, rotatable driving and driven members, cam means mounted on said driving member which means is adapted under predetermined conditions to be turned and wedged between said members and initiated solely as the result of sudden acceleration of said driving member and without the aid of centrifugal forces, said cam being arranged to remain out of contact with said driven member when said driving member is rotating at low speed, in the absence of sudden acceleration of the driving member, irrespective of the direction of drive.

13. A clutch comprising, in combination, rotatable driving and driven members, a cam, a spring which is mounted on said driving member and is connected to said cam, said spring being adapted to normally urge said cam radially inwardly of said driving member out of engagement with said driven member, said cam being so mounted that it can be rocked solely as the result of sudden acceleration of said driving member so as to ultimately wedge between said driving and driven members.

14. A clutch comprising, in combination, rotatable driving and driven members, cam means which selectively initiates wedging thereof and driving engagement of said members either as the result of centrifugal force of said driving member or as the result of sudden acceleration of said driving member, said cam means being arranged to be out of contact with said driven means when said driving means is rotating at low speed, in the absence of sudden acceleration of the driving member, irrespective of the direction of drive.

15. A clutch comprising, in combination, rotatable driving and driven means, cam means which initiates wedging thereof and driving engagement of said members either as the result of centrifugal force of said driving member or as the result of sudden acceleration of said driving member, said cam means remaining out of contact with said driven means when said driving means is rotating at low speed, in the absence of sudden acceleration of the driving member, irrespective of the direction of drive, and a thin, free-floating metallic ring between said driving and driven means.

16. A clutch comprising, in combination, rotatable driving and driven members, means which effects driving engagement of said members either as the result of centrifugal force of said driving member or as the result of sudden acceleration of said driving member, said means comprising a cam and spring mounted on said driving member, said spring being connected to said cam so as to normally urge said cam radially inwardly of said driving member and out of engagement with said driven member but to allow rocking of said cam under the influence of sudden acceleration of said driving and driven members to effect driving engagement between said members.

EDWIN E. ARNOLD.